US010422891B1

(12) United States Patent
Van Loef et al.

(10) Patent No.: US 10,422,891 B1
(45) Date of Patent: Sep. 24, 2019

(54) POLYMERIC-BASED SCINTILLATORS

(71) Applicant: Radiation Monitoring Devices, Inc., Watertown, MA (US)

(72) Inventors: Edgar V. Van Loef, Watertown, MA (US); Kanai S. Shah, Watertown, MA (US); Urmila Shirwadkar, Burlington, MA (US); Gary Markosyan, Framingham, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

(21) Appl. No.: 15/820,960

(22) Filed: Nov. 22, 2017

Related U.S. Application Data

(60) Provisional application No. 62/425,869, filed on Nov. 23, 2016.

(51) Int. Cl.
*G01T 1/20* (2006.01)
*G01T 1/203* (2006.01)
*G01T 3/06* (2006.01)
*C08L 25/16* (2006.01)
*C08L 33/12* (2006.01)
*C08L 25/06* (2006.01)
*C09K 11/66* (2006.01)

(52) U.S. Cl.
CPC ............ *G01T 1/2033* (2013.01); *C08L 25/06* (2013.01); *C08L 25/16* (2013.01); *C08L 33/12* (2013.01); *C09K 11/66* (2013.01); *G01T 3/06* (2013.01)

(58) Field of Classification Search
CPC ......... G01T 1/2033; G01T 3/06; C08L 33/12; C08L 25/06; C08L 25/16; C09K 11/66
USPC ...................................................... 250/361 R
See application file for complete search history.

(56) References Cited

U.S. PATENT DOCUMENTS

| 2004/0122182 | A1* | 6/2004 | Kawasaki | ................ C08K 5/18 525/326.2 |
| 2008/0064820 | A1* | 3/2008 | Kawasaki | ................ C08K 5/18 525/326.3 |
| 2014/0332689 | A1* | 11/2014 | Van Loef | .................. G01T 3/06 250/362 |
| 2016/0202362 | A1* | 7/2016 | Ichimura | ............... G01T 1/2018 250/366 |
| 2018/0265775 | A1* | 9/2018 | Zaitseva | .............. C09K 11/025 |

* cited by examiner

*Primary Examiner* — David P Porta
*Assistant Examiner* — Gisselle M Gutierrez
(74) *Attorney, Agent, or Firm* — Wolf, Greenfield & Sacks, P.C.

(57) ABSTRACT

Compositions, related to plastic scintillating materials based on a monomer combined with a cross-linker, an oxazole, and a fluorophore and/or an organometallic compound are disclosed. The disclosed plastic scintillator materials may advantageously provide gamma-neutron pulse shape discrimination capabilities.

24 Claims, 5 Drawing Sheets

POLYMERIC-BASED SCINTILLATORS

RELATED APPLICATIONS

This application claims priority to U.S. Provisional Patent Application Ser. No. 62/425,869, filed on Nov. 23, 2016, which is incorporated herein by reference.

FIELD OF INVENTION

The disclosure relates generally to scintillator technology and corresponding systems and methods.

BACKGROUND

Scintillators are widely used detectors for spectroscopy of energetic photons (e.g., X-rays and gamma-rays) as well as neutrons. These detectors are commonly used in nuclear and high energy physics research, medical imaging, diffraction, non-destructive testing, geological exploration, and other applications. Important properties for the scintillation crystals used in these applications include high light output, high gamma ray stopping efficiency (attenuation), fast response, low cost, good proportionality, minimal afterglow, and/or pulse shape discrimination. Thus, there is continued interest in the search for scintillator materials that have these properties.

At present, scintillation detectors based on commercially available organic liquids or plastics are often used for the detection of neutrons. These scintillators provide neutron detection via proton recoil due to their high hydrogen content. While these scintillators show fast response and are available in large sizes at relatively low cost, they have several performance limitations. Liquid scintillators provide neutron/gamma pulse shape discrimination (PSD), but they are based on organic compounds and have relatively low flash points (as low as 24° C., in some cases), and they can be relatively bulky and cumbersome to handle. The main limitation of current plastic scintillator materials for neutron detection is their inability to provide effective gamma-neutron discrimination on the basis of pulse shapes.

SUMMARY

Polymeric-based scintillating materials as well as related systems and methods are described herein.

In one aspect, a scintillator material is provided. The scintillator material comprises a monomer and/or polymer including an aromatic ring structure. The scintillator material further comprises an oxazole. The scintillator material comprises between about 10 weight percent to 40 weight percent of the oxazole. The scintillator material further comprises a cross-linker which links at least a first chain of the monomer and/or polymer to a second chain of the monomer and/or polymer. The scintillator material further comprises an organometallic compound.

In another aspect, a system for detecting radiation is provided. The system includes a detector which comprises the scintillator material described above. The system further includes a light detector assembly coupled to the scintillator material to detect a light pulse luminescence from the scintillator material.

In another aspect, a method of radiation detection is provided. The method comprises providing a detection system as described above. The method further comprises positioning the system such that a radiation source is within a field of view of the system so as to detect emissions from the source; and measuring a scintillation event luminescence signal from the scintillator material with the detection assembly.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
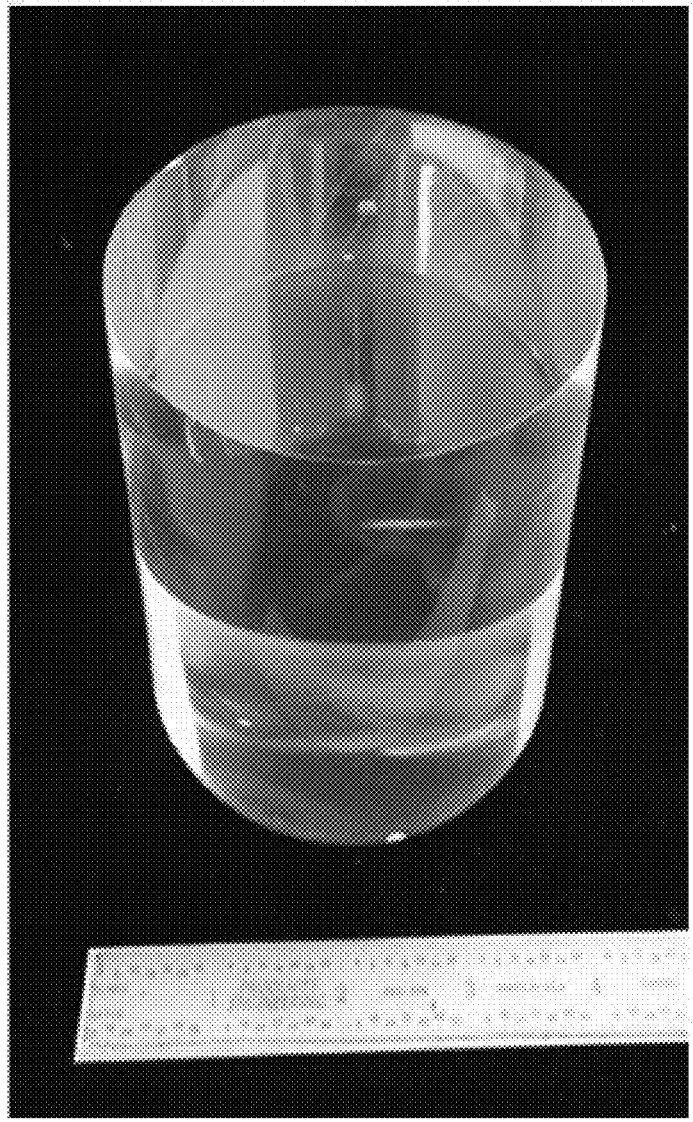
FIG. 1, according to certain embodiments, is a photograph of an exemplary plastic scintillator under ambient illumination.

The inventors have recognized several limitations with previous plastic scintillator materials. For example, certain plastic scintillators exhibit an inability to provide effective gamma-neutron discrimination on the basis of pulse shapes. Furthermore, certain plastic scintillators suffer from mechanical issues, such as being soft and deformable. Consequently, the inventors have recognized the advantages of providing a plastic scintillator capable of discriminating gamma radiation and neutrons with improved mechanical properties. Such materials may offer both versatile and cheap radiation detectors. As described in more detail below, certain embodiments are related to scintillation materials comprising monomers and/or polymers with an aromatic ring structure, high concentrations of a scintillating additive (e.g., an oxazole), a cross-linker, and an organometallic compound.

In one embodiment, the plastic scintillator includes a monomer and/or polymer with an aromatic ring structure. Depending on the embodiment, possible monomers include, but are not limited to, at least one of styrene, vinyltoluene, acrylonitrile, and/or methylmethacrylate. According to certain embodiments, the monomer is styrene. In some embodiments, possible polymers include, but are not limited to, at least one of polystyrene, polyvinyltoluene, polyacrylnitrile, and/or poly(methylmethacrylate). According to certain embodiments, the polymer is polystyrene. It should be understood that other monomers and/or polymers are also possible. In addition, embodiments in which a combination of monomers and/or polymers are used are also envisioned.

Depending upon the particular scintillation mechanism present in the resulting plastic scintillator, it may be advantageous in some embodiments to remove free oxygen prior to polymerization by bubbling inert gas through the material and subsequently providing a vacuum to remove ambient air, including oxygen, from the material. Without wishing to be bound by theory, in some embodiments, carbonyl groups may interfere with the scintillation properties of the resulting plastic scintillators. Thus, in some embodiments, the monomer and/or polymer may be substantially free of carbonyl groups.

In certain embodiments, the plastic scintillator material further comprises a co-polymer. In some cases, possible co-polymers include, but are not limited to, at least one of polystyrene, polyvinyltoluene, polyacrylnitrile, and/or poly (methylmethacrylate). It should be understood that other co-polymers are also possible, as described herein in further detail. According to certain embodiments, the co-polymer can be a different chemical composition than the monomer and/or polymer described above.

In a related embodiment, the above-noted monomer and/or polymer is doped with an appropriate scintillating additive. In one particular embodiment, an oxazole is used to dope the monomer and/or polymer to provide the desired scintillating properties. It should be understood that any number of different types of oxazoles might be used. For example, in one embodiment, the oxazole may be 2,5-diphenyloxazole (PPO).

In certain embodiments, the oxazole may be a pulse shape discrimination additive. Advantageously, plastic scintillators made with PPO have an emission that matches bialkali photomultipliers ($\lambda \sim 425$ nm), exhibit a fast scintillation decay, provide good light yield, and exhibit excellent neutron-gamma PSD. Consequently, plastic scintillators incorporating PPO may be easily integrated into systems for detecting radiation.

In one embodiment, the scintillating additive is present in any appropriate concentration up to and including the solubility limit of the scintillating additive in the resulting monomer and/or polymer. For example, in several non-limiting embodiments, an oxazole may be present in a concentration between about 1 weight percent to 50 weight percent, about 10 weight percent to 40 weight percent, about 20 weight percent to 30 weight percent, or any other appropriate concentration. While many embodiments may include a concentration of the scintillating additive that is less than, or equal to, the solubility limit in the resulting monomer and/or polymer, embodiments in which the scintillating additive is present in a concentration greater than the solubility limit are also possible.

Without wishing to be bound by theory, in one embodiment, the scintillating additive may be interstitially located between adjacent monomer and/or polymer chains, for example, as is the case with PPO. In other embodiments, the scintillating additive may act as a co-polymer, as described above, and may be integrated into the monomer and/or polymer chains in the final polymerized material. Regardless of the method in which the scintillating additive is integrated, the scintillating additive may remain in solution. However, the current disclosure is not limited in this fashion. In some embodiments, a portion of the scintillating additive may be partially soluble, or even insoluble, with the base composition.

As noted above, the plastic scintillator material may also include a cross-linker appropriate for the particular monomer and/or polymer incorporated in the plastic scintillator. For example, in one embodiment, the cross-linker includes two vinyl groups. In another embodiment, the cross-linker includes an aromatic ring structure. Without wishing to be bound by theory, this may help to enhance the scintillation properties of the resulting plastic scintillator. According to certain embodiments, possible cross-linkers include, but are not limited to, at least one of divinylbenzene and/or triallylisocyanurate. In one particular embodiment, the cross-linker is divinylbenzene. It should be understood that other cross-linkers are also possible. In addition, embodiments in which a combination of cross-linkers are used is also envisioned.

The cross-linker may also be present in the scintillator material in any appropriate amount. For example, the cross-linker may be present in the scintillator material in a concentration of less than about 2 weight percent, between about 0.001 weight percent to 2 weight percent, between about 0.1 weight percent to 1.0 weight percent, or between about 0.2 weight percent to 0.4 weight percent. The particular concentration of the cross-linker may be selected for any number of reasons. For example, in one embodiment, the concentration of the cross-linker may be less than a preselected concentration to substantially prevent the formation of cracks in the final resulting scintillator material.

A cross-link is a bond that links one monomer and/or polymer chain to another. The bond may be a covalent bond or an ionic bond. A cross-linker generally refers to a substance that forms bonds (i.e., links) between monomer and/or polymer chains. In some embodiments, a cross-linker forms bonds between chains of the same monomer and/or polymer (e.g., the cross-linker links at least a first chain of a monomer and/or polymer to a second chain of the monomer and/or polymer). For example, in embodiments when the monomer comprises styrene, divinylbenzene may be used as a cross-linker to form covalent bonds between at least two styrene chains. In certain cases, a covalently cross-linked styrene matrix may be formed. In certain embodiments when the polymer comprises polystyrene, divinylbenzene may be used as a cross-linker to form covalent bonds between at least two polystyrene chains. In some cases, a covalently cross-linked polystyrene matrix may be formed.

According to certain embodiments, a cross-linker forms bonds between chains of at least two different monomers and/or polymers (e.g., the cross-linker links at least a chain of a first monomer and/or polymer to a chain of a second, different monomer and/or polymer). For example, in some embodiments the monomer may comprise styrene and vinyltoluene, and divinylbenzene may be used as a cross-linker to form covalent bonds between styrene and vinyltoluene. In certain other embodiments, the polymer may comprise polystyrene and polyvinyltoluene, and divinylbenzene may be used as a cross-linker to form covalent bonds between polystyrene and polyvinyltoluene. When monomer and/or polymer chains are linked together, they lose some of their ability to move/rotate as individual monomer and/or polymer chains.

It is known that cross-linking in certain plastic scintillators including relatively low concentrations of the scintillating additive leads to an alteration of the energy transfer mechanism and causes excited electrons to relax to the ground state through non-radiative decay. As a result, the light yield of a cross-linked standard plastic scintillator is reduced. However, during the development of the current plastic scintillators, it was discovered that rapid polymerization in combination with relatively high concentrations of the scintillating additive with the use of, for example, divinylbenzene as a cross-linking agent actually led to an increase in the light yield (+20%) and provided pulse/shape discrimination capabilities for the resulting plastic scintillators.

Without wishing to be bound by theory, the above-noted phenomenon can be explained by the physics of the cross-linking process in an environment of high PPO concentrations, as cross-linking allows for: a more uniform distribution of PPO molecules; restraint of the PPO molecules by the polystyrene macromolecules leading to less "silvering" (leaching out of molecules); and better thermal and mechanical properties due to the creation of a 3D network.

In certain embodiments, an organometallic compound additive is added to the scintillator material. As used herein, an organometallic compound is given its ordinary meaning in the art and refers to a chemical compound containing at least one chemical bond between a metal and a carbon atom of an organic compound. In certain embodiments, the metal of the organometallic compound includes, but is not limited to, at least one of Sn, Pb, Ge, Si, Hf, Zr, and/or Ti. In some embodiments, the metal in the organometallic compound is directly bound to at least one carbon atom of an organic compound in the organometallic compound. Organometallic compounds may shift the wavelength of light to a more desired wavelength and allow for gamma spectroscopy detection.

According to certain embodiments, the organometallic compound is an organotin compound. In certain embodiments, the organometallic compound is an organolead compound. In some embodiments, possible organometallic compounds include, but are not limited to, at least one of allyltriphenyltin, trimethyl(4-vinylphenyl)stannane, and/or triphenyl(4-vinylphenyl)plumbane. In some particular embodiments, the organometallic compound trimethyl(4-vinylphenyl)stannane. In certain embodiments, the organometallic compound is triphenyl(4-vinylphenyl)plumbane. It should be understood that other organometallic compounds are also possible. In addition, embodiments in which a combination of organometallic compounds are used is also possible.

In some embodiments, the organometallic compound is present in any appropriate concentration up to and including the solubility limit of the organometallic compound in the resulting monomer and/or polymer. For example, in several non-limiting embodiments, an organometallic compound may be present in a concentration between about 1 weight percent to 99 weight percent, about 2 weight percent to 50 weight percent, about 5 weight percent to 30 weight percent, about 10 weight percent to 25 weight percent, or any other appropriate concentration. According to some embodiments, an organotin compound may be present in a concentration between about 1 weight percent to 99 weight percent, about 2 weight percent to 50 weight percent, about 5 weight percent to 30 weight percent, about 10 weight percent to 25 weight percent, or any other appropriate concentration. In other certain embodiments, an organolead compound may be present in a concentration between about 1 weight percent to 40 weight percent, about 2 weight percent to 30 weight percent, about 5 weight percent to 20 weight percent, or any other appropriate concentration.

In at least one embodiment, the plastic scintillator may include other additives or wavelength shifters in addition to the oxazole and organometallic compound present in the plastic scintillator. For example, in certain embodiments, the plastic scintillator may include a fluorophore. As used herein, a fluorophore is given its ordinary meaning in the art and refers to a chemical compound that can emit light upon excitation. Addition of a fluorophore to the plastic scintillator material provides benefits including an increase in light output and a shift in the wavelength of light to a more desired wavelength. Alternatively, in another embodiment, a portion of the oxazole might be replaced with one or more additives or wavelength shifters.

Possible additional additives and wavelength shifters (e.g., fluorophores), include, but are not limited to, at least one of PPO, diphenylanthracene (DPA), 1,4-bis(5-phenyloxazol-2-yl)benzene (POPOP), 1,4-bis[4-(di-p-tolylamino)styryl]benzene (TASB), p-terphenyl, quaterphenyl, coumarin, naphthalene, dimethylnaphthalene, vinylnaphthalene, diphenyloxadiazole (PPD), methylstyrylbenzene (MSB), bis-MSB, anthracene, 1-phenyl-3-mesityl-2-pyrazoline (PMP), and/or bis(2-(4,6-difluorophenyl)pyridinato-N,C2' (Flrpic). While the above additives and wavelength shifters have been disclosed, it is envisioned that other suitable additives and wavelength shifters could also be used. Similarly, the additives and wavelength shifters may be added to the composition in suitable weight percentages for their intended purpose. For example, the above additives and wavelength shifters may be present in a range of about 0 weight percent to 40 weight percent, 5 weight percent to 30 weight percent, 10 weight percent to 15 weight percent, or any other appropriate concentration.

According to some embodiments, the scintillator material comprises a monomer and/or polymer, a scintillating additive (e.g., an oxazole), a cross-linker, and an organometallic compound. For example, in certain embodiments, the scintillator material may comprise polystyrene, high concentrations of PPO as a scintillating additive, divinylbenzene to cross-link polystyrene, and trimethyl(4-vinylphenyl)stannane as an organometallic compound. In some cases, the scintillator material comprises a monomer and/or polymer, a scintillating additive (e.g., an oxazole), a cross-linker, an organometallic compound, and another additive (e.g., a fluorophore). For example, in certain embodiments, the scintillator material may comprise polystyrene, high concentrations of PPO as a scintillating additive, divinylbenzene to cross-link polystyrene, trimethyl(4-vinylphenyl)stannane as an organometallic compound, and POPOP as a fluorophore.

One of the valuable characteristics of at least some of the embodiments of the presently disclosed plastic scintillators is the ability to differentiate neutrons from gamma rays (e.g., PSD). The timing profile of a gamma-ray scintillation event differs compared to a neutron scintillation event. For incident gamma-rays, scintillation is very fast, including a fast light decay. The neutron scintillation event exhibits a relatively slower timing profile. The difference in the timing profile between gamma-ray scintillation events and neutron scintillation events can facilitate differentiation between gamma-ray detection and neutron detection. In particular, such differences enable gamma-ray detection and neutron detection to be differentiated using PSD analysis. PSD analysis, in general, involves comparing the luminescence signal pulse shape resulting from gamma-ray detection to the luminescence signal pulse shape resulting from neutron detection. In some embodiments, it may be advantageous to use PSD analysis over relatively long time periods to differentiate gamma-ray detection and neutron detection. Relatively long PSD times are particularly useful in embodiments when the scintillator is relatively thick, for example, greater than 1 cm, greater than 5 cm, etc.

Standard plastic curing and molding techniques may be applied to the above compositions to make low cost large size detectors. In some embodiments, the associated polymerization equipment may operate around room temperature, though elevated curing temperatures are also possible. Therefore, the container material and other components may be exposed to relatively benign conditions. Thus, polymerization may allow the use of cheap and simple equipment and many runs can be conducted with minimal use of expendable components. Another point in favor of using polymerization techniques is power utilization. Since polymerization generally occurs relatively close to room temperature, only a few watts of operational power may be required. Furthermore, the use of polymerization may enable the production of samples in the size range of 5 $cm^3$ to 20 $cm^3$, though both larger and smaller sample sizes may also be obtained. In view of the above, using polymerization techniques for manufacturing the above disclosed scintillating materials may be an attractive manufacturing method.

In one embodiment, the initial steps of fabricating the plastic scintillating material may be the preparation and filtration of the monomers and/or polymers to be used. Specifically, the monomers and/or polymers may be treated and/or filtered to remove small particulates and inhibitors present. In one embodiment, a glass column with activated alumina may be used to treat and filter the material, though other activated materials may be used. The material may slowly pass through the column. Subsequently, the inhibitor may be removed using a chromatography process while the pure monomer and/or polymer may be collected at the bottom of the column in a clean beaker. Vacuum distillation or a zone refining process can also be used for initial material purification. After initial purification, the oxazole, or other appropriate scintillating additive, may be dissolved, or otherwise added, to the monomer and/or polymer. In addition to the oxazole, in some embodiments, a cross-linker, as described above, is also added to the monomers and/or polymers. In addition to the oxazole and the cross-linker, in certain embodiments, the additive or wavelength shifter (e.g., fluorophore) is added to the monomers and/or polymers. According to some embodiments, in addition to the oxazole and the cross-linker, an organometallic compound is added to the monomers and/or polymers. In some embodiments, both an organometallic compound and an additive or wavelength shift (e.g., a fluorophore) may be added to the monomer and/or polymer in addition to the oxazole and the cross-linker. Depending on the embodiment, additional scintillating additives might be added to the monomers and/or polymers, as well.

After combining the monomers and/or polymers, with the dopants and additives, the material may be polymerized using thermal, anionic, cationic, or any other applicable polymerization technique. In one embodiment, anionic polymerization may be performed using 2,2'-azo-bis-isobutyrylnitrile (AIBN), benzoylperoxide, or other appropriate initiators. In another embodiment, thermal polymerization may be preferred. Thermal polymerization may be performed at temperatures between 30° C. to 140° C. for a period of four to six days, depending on the size and volume of the plastic scintillator material to be made. For example, in one embodiment, the polymerization may be performed at about 50° C. Thermal polymerization may be done under oxygen-free conditions and at temperatures that do not allow the monomer to boil. Further, in some embodiments, prior to polymerization, inert gas may be bubbled through the monomers and/or polymers prior to sealing and pumping to further reduce oxygen in the resulting material. Should bubbles appear in the monomer and/or polymer, the temperature and/or pressure may be adjusted depending on the type and degree of polymerization to substantially eliminate the bubbles in the specimen. The container holding the material may provide homogeneous heat distribution throughout (i.e. may be heated evenly) to prevent uneven and/or excessive localized polymerization. Uneven heat distribution may lead to gas bubble formation and excessive laminar pressure which could prevent bubbles from floating to the top and escaping. In some embodiments, it may be desirable to monitor the progress of polymerization daily in order to determine whether the process has been fully completed. Post-processing operations such as cutting, grinding, polishing, heat treatment and other applicable processes may be conducted after the polymerization process is complete to obtain a transparent and optically clear sample.

The plastic scintillator material compositions described herein may be used in detectors. The detection system may comprise a scintillator material comprising a monomer and/or polymer including an aromatic ring structure, an oxazole, a cross-linker, and an organometallic compound. The detector may include one or more scintillators optically coupled to a light detector assembly, such as a light photodetector, or imaging device, or other appropriate light sensitive detector. The detector assembly may include a data analysis system to process information from the scintillator and light sensitive detector. Non-limiting examples of a light detector assembly include photomultiplier tubes (PMT), photodiodes, CCD sensors, image intensifiers, and the like. Choice of a particular light detector assembly will depend in part on the type of radiation detector being fabricated and on its intended use of the device. In certain embodiments, the photodetector may be position-sensitive. In use, the detector detects energetic radiation emitted from a source.

The detection system may be used to detect radiation, according to certain embodiments. For example, a detection assembly coupled to scintillator materials described herein may detect light pulse luminescence from the scintillator as a measure of a scintillation event. In some embodiments, the system can be positions such that a radiation source is within a field of view of the system so as to detect emissions from the source, and the detection assembly can be used to measure a scintillation event luminescence signal from the scintillator material.

The detector assemblies themselves, which can may include the plastic scintillator material and the light detector assembly, may be connected to a variety of tools and devices. Non-limiting examples include monitoring and detection devices, well-logging tools, and imaging devices such as X-ray Computed Tomography (CT), X-ray fluoroscopy, X-ray cameras (such as for security uses), Positron Emission Tomography (PET), and other nuclear medical imaging or detection devices. The above examples are merely illustrative of the types of application the current composition may be used for and should not be interpreted to limit the use of the present material in other appropriate applications. Various technologies for operably coupling or integrating a radiation detector assembly containing a scintillator to a detection device may be utilized.

A data analysis system may be coupled to the detector. The data analysis system may include, for example, a module or system to process information (e.g., radiation detection information) from the detector/light detector assembly. The data analysis system may also include, for example, a wide variety of proprietary or commercially available computers, electronics, systems having one or more processing structures, or the like. The systems may have data processing hardware and/or software configured to implement any one (or combination of) the method steps described herein. The methods may further be embodied as programming instructions in a tangible non-transitory media such as a memory, a digital or optical recording media, or other appropriate device.

Example 1

Multiple plastic scintillators were fabricated from styrene monomer containing 2 weight percent to 20 weight percent PPO and 10 weight percent to 20 weight percent organometallic compound.

Polymerization of the monomers was performed at temperatures between 30 to 140° C. for a period of up to several weeks, depending on the size and volume of the plastic scintillator. The polymerization was performed after the addition of the scintillating additive and organometallic compound under oxygen-free conditions and at temperatures that did not allow the monomer to boil. When bubbles appeared in the liquid, the temperature and pressure of the equipment was adjusted depending on the type and polymerization degree of the specimen. The progress of polymerization was monitored daily until the fabrication of the plastic scintillator was completed.

After completion of the polymerization, the polymers (plastic scintillators) were removed from their glass ampoules, vials or containers. In the case of a glass ampoule, a cutting station was used to open the ampoule. First, a circular cut was made with a diamond-blade around the glass ampoule just above the top of the plastic. Next, a point was softly tapped on the cut until a crack in the glass ampoule appeared. By tapping around and towards the end of the glass ampoule, the glass broke away from the plastic scintillator and the plastic scintillator was subsequently removed. Removal of the plastic scintillators from vials or other containers was simply performed by opening the cap of the vial/container and tapping at the bottom of the vial/container.

Subsequently, the plastic scintillators were polished on a disc/belt grinder with 240 grit pads and water cooling. Next, the plastic scintillators were manually ground with fine 600 grit paper. The final polish was done with a polymer cloth and polishing suspension. After the polishing, the plastic scintillators were optically inspected (by eye) for any surface scratches or inhomogeneities.

One example of the prepared plastic scintillators is presented in FIG. 1 under ambient light and ultraviolet light respectively.

Example 2

Figure 2:
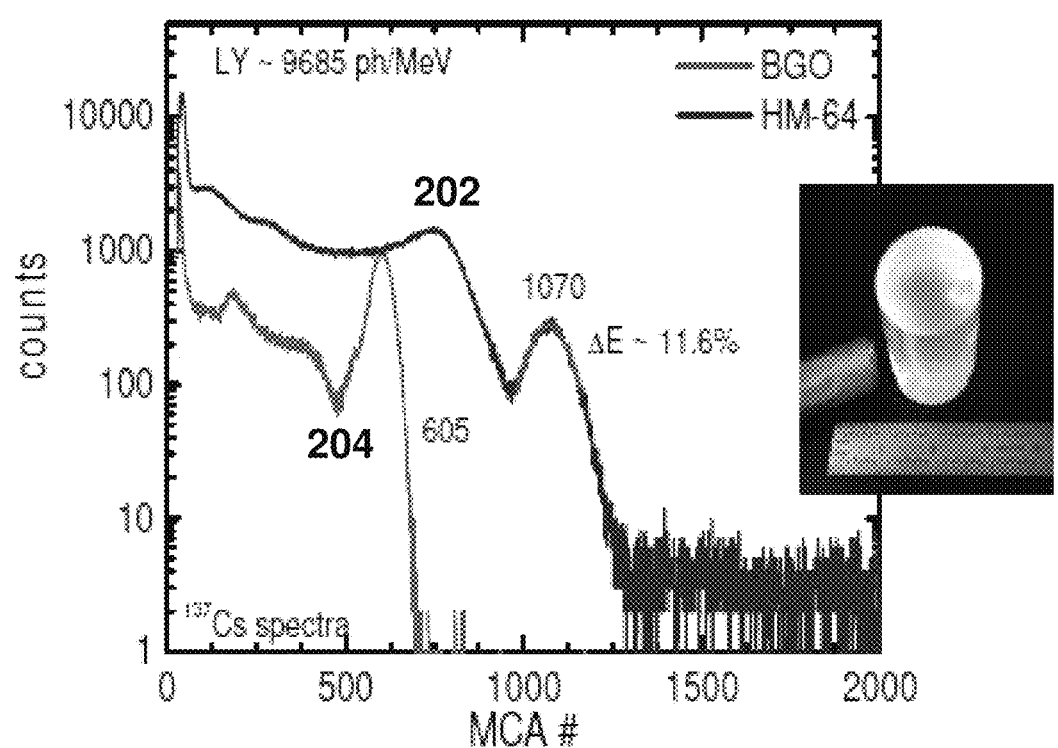
FIG. 2 is, according to certain embodiments, a graph of a pulse height spectrum of a polystyrene plastic scintillator doped with 2% PPO and 30% trimethyl(4-vinylphenyl) stannane compared to the spectrum of a bismuth germinate (BGO) crystal.

The light output of a polystyrene plastic scintillator incorporating 2% PPO and 30% trimethyl(4-vinylphenyl)stannane was measured by comparing the response to gamma rays with an energy of 662 keV ($^{137}$Cs) to the response of BGO. The measurement involved irradiating the plastic scintillators with 662 keV gamma-rays from a $^{137}$Cs source. The scintillation light was detected with a Hamamatsu R6231-100 PMT. The signal output of the PMT was connected to a Canberra 2005 preamplifier and a Canberra 2022 spectroscopic amplifier. The plastic scintillators were optically coupled onto the window of the PMT using Bicron BC-630 optical grease. To minimize losses in light yield, the plastics scintillators were covered with several layers of 0.1-mm thick UV reflecting Teflon tape. FIG. 2 shows the pulse height spectrum of a plastic scintillator doped with PPO and trimethyl(4-vinylphenyl)stannane 202 under $^{137}$Cs 662 keV gamma-ray excitation. To compare, the spectrum of a BGO crystal 204 is shown as well. Based on the light yield of BGO, the Compton edge position in the spectrum of the plastic scintillator and BGO, and the spectral response of the system, it is estimated that the light yield of the plastic scintillator is about 9,685 ph/MeV.

Example 3

Figure 3:
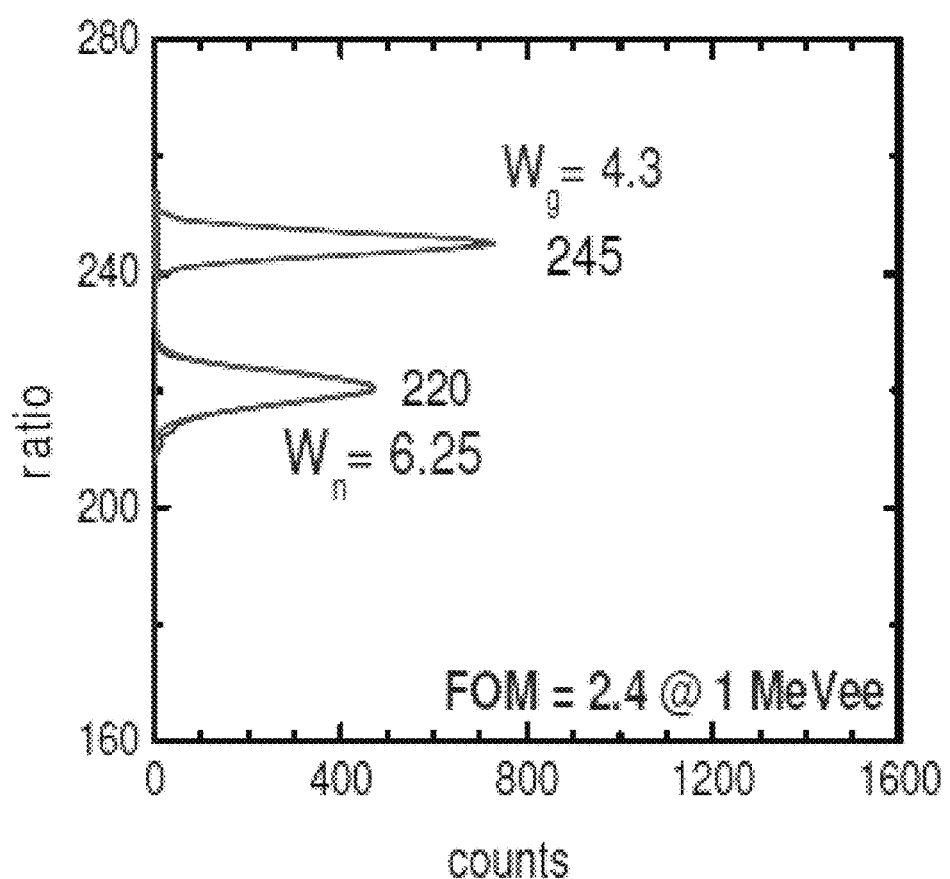
FIG. 3 is, according to some embodiments, a graph of the figure of merit (FOM) of a polystyrene plastic scintillator with 20% PPO and 10% trimethyl(4-vinylphenyl) stannane.

The FOM for a plastic scintillator with high PPO concentration (20%) and 10% trimethyl(4-vinylphenyl)stannane is shown in FIG. 3 and was calculated to be 2.4. Considering that for traditional plastic scintillators, PSD is either absent or negligible, a measured FOM of 2.4 for the current fabricated plastic scintillators is excellent.

Example 4

Figure 4:
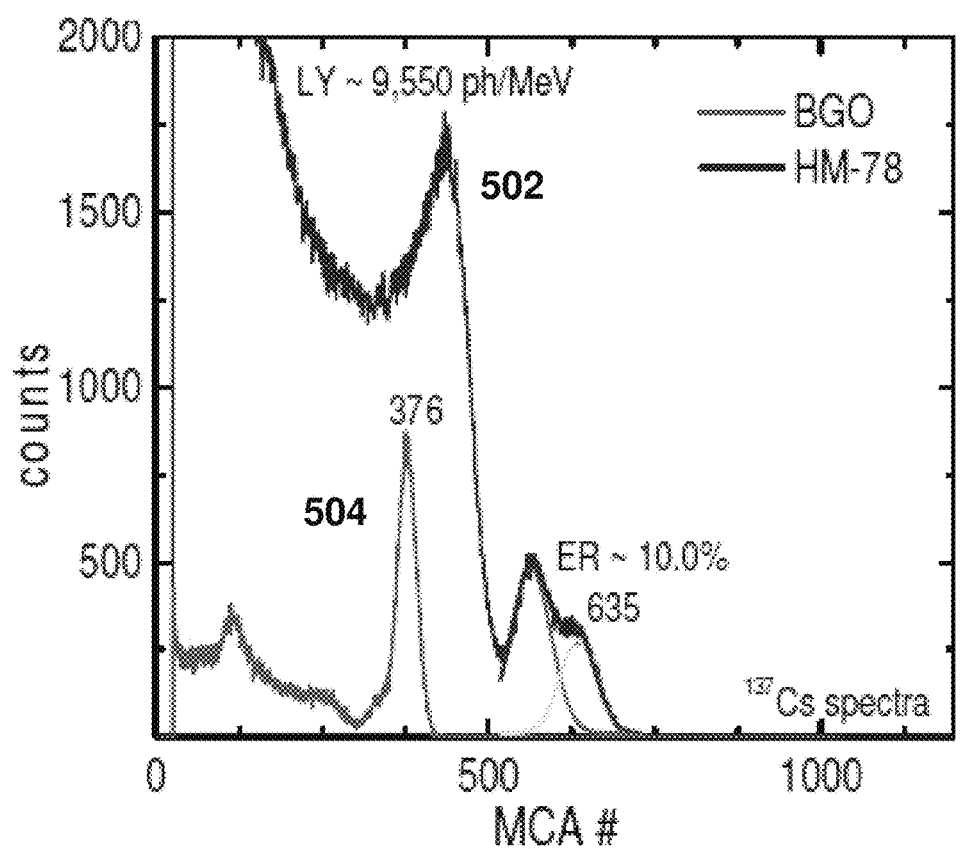
FIG. 4 is, according to certain embodiments, a graph of a pulse height spectrum of a polystyrene plastic scintillator doped with 20% PPO and 20% triphenyl(4-vinylphenyl) plumbane compared to the spectrum of a bismuth germinate (BGO) crystal.

The light output of a polystyrene plastic scintillator incorporating 20% PPO and 20% triphenyl(4-vinylphenyl)plumbane was measured by comparing the response to gamma rays with an energy of 662 keV ($^{137}$Cs) to the response of BGO, similar to Example 2 above. FIG. 4 shows the pulse height spectrum of a plastic scintillator doped with PPO and trimethyl(4-vinylphenyl)stannane 502 under $^{137}$Cs 662 keV gamma-ray excitation. To compare, the spectrum of a BGO crystal 504 is shown as well. Based on the light yield of BGO, the Compton edge position in the spectrum of the plastic scintillator and BGO, and the spectral response of the system, it is estimated that the light yield of the plastic scintillator is about 9,550 ph/MeV.

Example 5

Figure 5:
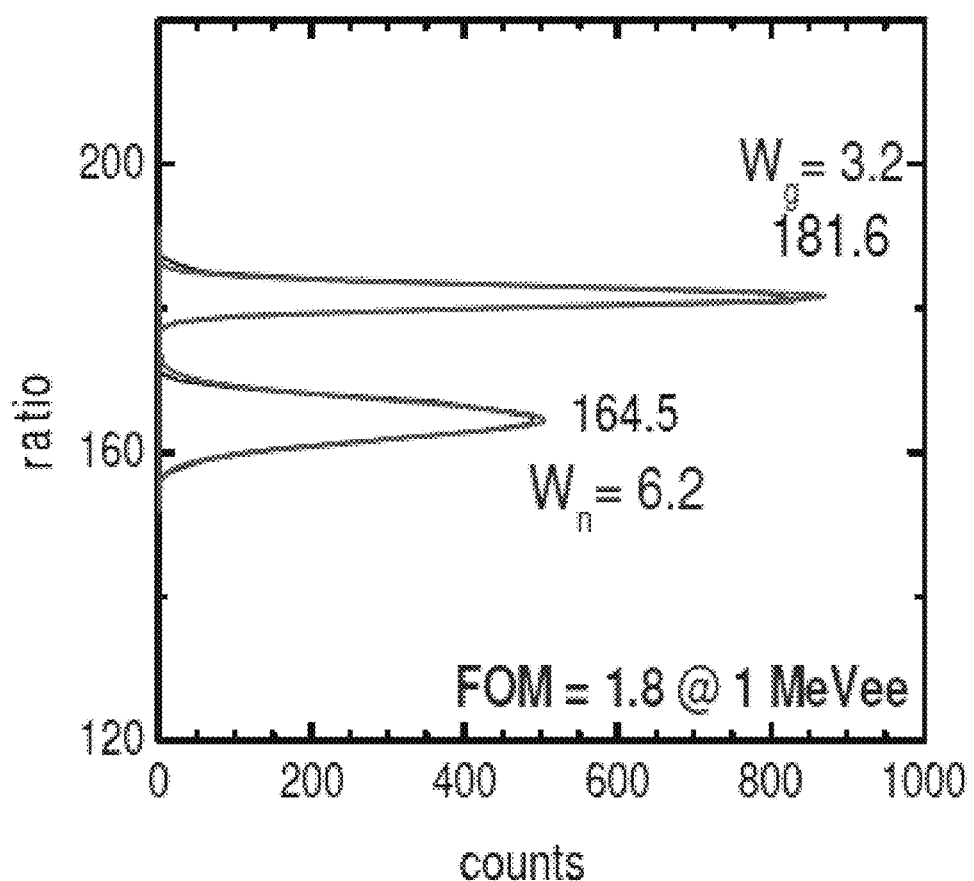
FIG. 5 is, according to some embodiments, a graph of the FOM of a polystyrene plastic scintillator with 20% PPO and 20% triphenyl(4-vinylphenyl)plumbane.

The FOM for a plastic scintillator with 20% PPO concentration and 20% triphenyl(4-vinylphenyl)plumbane is shown in FIG. 5 and was calculated to be 1.8. Considering that for traditional plastic scintillators, PSD is either absent or negligible, a measured FOM of 1.8 for the current fabricated plastic scintillators is excellent.

What is claimed is:
1. A scintillator material comprising:
a monomer and/or polymer including an aromatic ring structure;
an oxazole, wherein the scintillator material comprises between about 10 weight percent to 40 weight percent of the oxazole;
a cross-linker, wherein the cross-linker links at least a first chain of the monomer and/or polymer to a second chain of the monomer and/or polymer; and
an organometallic compound,
wherein a metal in the organometallic compound is selected from the group consisting of Sn, Pb, Ge, Si, Hf, Zr, and Ti and
wherein the metal in the organometallic compound is directly bound to at least one carbon atom of an organic compound in the organometallic compound.
2. The scintillator material of claim 1, wherein the monomer and/or polymer is free of carbonyl groups.
3. The scintillator material of claim 1, wherein the monomer is selected from the group consisting of styrene, vinyltoluene, acrylonitrile, and methylmethacrylate.
4. The scintillator material of claim 1, wherein the monomer is styrene.

5. The scintillator material of claim 1, wherein the polymer is selected from the group consisting of polystyrene, polyvinyltoluene, polyacrylnitrile, and poly(methylmethacrylate).

6. The scintillator material of claim 1, wherein the polymer is polystyrene.

7. The scintillator material of claim 1, further comprising a co-polymer.

8. The scintillator material of claim 7, wherein the co-polymer is selected from the group consisting of polystyrene, polyvinyltoluene, polyacrylnitrile, and poly(methylmethacrylate).

9. The scintillator material of claim 1, wherein the oxazole is a pulse shape discrimination additive.

10. The scintillator material of claim 1, wherein the oxazole is 2,5-diphenyloxazole.

11. The scintillator material of claim 1, wherein the scintillator material comprises between about 20 weight percent to 30 weight percent of the oxazole.

12. The scintillator material of claim 1, wherein the cross-linker comprises an aromatic ring structure.

13. The scintillator material of claim 1, wherein the cross-linker is selected from the group consisting of divinylbenzene, triallylisocyanurate, and trimethyl(4-vinylphenyl)stannane.

14. The scintillator material of claim 1, wherein the cross-linker comprises two vinyl groups.

15. The scintillator material of claim 1, wherein the cross-linker is divinylbenzene.

16. The scintillator material of claim 1, wherein the scintillator material comprises less than about 2 weight percent of the cross-linker.

17. The scintillator material of claim 1, wherein the scintillator material comprises between about 0.001 weight percent to 2 weight percent of the cross-linker.

18. The scintillator material of claim 1, wherein the scintillator material comprises between about 0.1 weight percent to 1.0 weight percent of the cross-linker.

19. The scintillator material of claim 1, wherein the scintillator material comprises between about 0.2 percent to 0.4 weight percent of the cross-linker.

20. A scintillator material comprising:
a monomer and/or polymer including an aromatic ring structure;
an oxazole, wherein the scintillator material comprises between about 10 weight percent to 40 weight percent of the oxazole;
a cross-linker, wherein the cross-linker links at least a first chain of the monomer and/or polymer to a second chain of the monomer and/or polymer; and
an organometallic compound,
wherein the organometallic compound is an organotin compound.

21. A scintillator material comprising:
a monomer and/or polymer including an aromatic ring structure;
an oxazole, wherein the scintillator material comprises between about 10 weight percent to 40 weight percent of the oxazole;
a cross-linker, wherein the cross-linker links at least a first chain of the monomer and/or polymer to a second chain of the monomer and/or polymer; and
an organometallic compound,
wherein the organometallic compound is an organolead compound.

22. A scintillator material comprising:
a monomer and/or polymer including an aromatic ring structure;
an oxazole, wherein the scintillator material comprises between about 10 weight percent to 40 weight percent of the oxazole;
a cross-linker, wherein the cross-linker links at least a first chain of the monomer and/or polymer to a second chain of the monomer and/or polymer; and
an organometallic compound,
wherein the organometallic compound is selected from the group consisting of allyltiphenyltin, trimethyl(4-vinylphenyl)stannane, and triphenyl(4-vinylphenyl)plumbane.

23. A system for detecting radiation, comprising:
a detector comprising a scintillator material as recited in claim 1; and
a light detector assembly coupled to the scintillator material to detect a light pulse luminescence from the scintillator material.

24. A method of radiation detection, comprising:
providing a detection system comprising:
a scintillator material as recited in claim 1; and
a detection assembly coupled to the scintillator material to detect a light pulse luminescence from the scintillator as a measure of a scintillation event;
positioning the system such that a radiation source is within a field of view of the system so as to detect emissions from the source; and
measuring a scintillation event luminescence signal from the scintillator material with the detection assembly.

* * * * *